(12) United States Patent
Harada et al.

(10) Patent No.: US 10,173,168 B2
(45) Date of Patent: Jan. 8, 2019

(54) VAPOR SEPARATOR AND DEHUMIDIFIER USING THE SAME

(71) Applicant: KABUSHIKI KAISHA TOSHIBA, Minato-ku (JP)

(72) Inventors: Koichi Harada, Bunkyo (JP); Hitomi Saito, Kawaguchi (JP); Maki Yonetsu, Mitaka (JP); Seiichi Suenaga, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 287 days.

(21) Appl. No.: 15/255,780

(22) Filed: Sep. 2, 2016

(65) Prior Publication Data

US 2017/0259205 A1  Sep. 14, 2017

(30) Foreign Application Priority Data

Mar. 11, 2016 (JP) ................. 2016-047767

(51) Int. Cl.
| | |
|---|---|
| *B01D 53/02* | (2006.01) |
| *B01D 53/26* | (2006.01) |
| *B01D 53/28* | (2006.01) |
| *F24F 3/14* | (2006.01) |
| *B01D 53/22* | (2006.01) |

(52) U.S. Cl.
CPC ......... *B01D 53/261* (2013.01); *B01D 53/268* (2013.01); *B01D 53/28* (2013.01); *F24F 3/1411* (2013.01); *B01D 53/229* (2013.01); *B01D 53/263* (2013.01); *B01D 2253/10* (2013.01);
(Continued)

(58) Field of Classification Search
CPC ............ B01D 2253/10; B01D 2253/25; B01D 53/229; B01D 53/261; B01D 53/263; B01D 53/268; B01D 53/28; C07K 14/475; C07K 2319/036; C07K 2319/21; C12N 2510/02; F24F 2003/1435; F24F 3/1411
See application file for complete search history.

(56) References Cited

U.S. PATENT DOCUMENTS

| | | | | |
|---|---|---|---|---|
| 3,176,446 A | * | 4/1965 | Siggelin | B01D 45/14 165/10 |
| 6,509,060 B1 | * | 1/2003 | Komoda | B01D 67/0046 427/235 |

(Continued)

FOREIGN PATENT DOCUMENTS

| | | |
|---|---|---|
| JP | 7-328375 | 12/1995 |
| JP | 2004-315557 | 11/2004 |

(Continued)

*Primary Examiner* — Christopher P Jones
(74) *Attorney, Agent, or Firm* — Oblon, McClelland, Maier & Neustadt, L.L.P.

(57) ABSTRACT

A vapor separator in an embodiment is arranged between a first space and a second space, and is used to allow vapor existing in the first space to permeate in the second space by making a vapor pressure in the second space lower than a vapor pressure in the first space. The vapor separator in the embodiment includes: a porous body including a first face in contact with the first space and having a convexo-concave structure, a second face in contact with the second space, and fine pores passing to the second face from at least wall of the first face which constitutes the convexo-concave structure; and water existing in the fine pores of the porous body.

14 Claims, 4 Drawing Sheets

(52) U.S. Cl.
CPC .. *B01D 2253/25* (2013.01); *F24F 2003/1435* (2013.01)

(56) References Cited

U.S. PATENT DOCUMENTS

| | | | | |
|---|---|---|---|---|
| 7,329,300 | B2* | 2/2008 | Ichikawa | B01D 46/0001 264/138 |
| 8,506,675 | B2* | 8/2013 | Ellsworth | B01D 53/261 95/10 |
| 2007/0185292 | A1* | 8/2007 | Nishida | B01D 53/261 526/214 |
| 2008/0034966 | A1* | 2/2008 | Kesten | B01D 53/229 95/52 |
| 2009/0038278 | A1* | 2/2009 | Pauwels | B01D 29/23 55/480 |
| 2009/0071621 | A1* | 3/2009 | Oles | B22C 9/12 164/7.1 |
| 2009/0206025 | A1* | 8/2009 | Ichikawa | B01D 53/228 210/489 |
| 2009/0293359 | A1* | 12/2009 | Simmons | C01B 3/34 48/127.7 |
| 2011/0192579 | A1 | 8/2011 | Sotokawa et al. | |
| 2017/0232383 | A1* | 8/2017 | Yeung | B01J 20/22 95/117 |
| 2017/0259205 | A1* | 9/2017 | Harada | B01D 53/261 |

FOREIGN PATENT DOCUMENTS

| | | |
|---|---|---|
| JP | 2010-94636 | 4/2010 |
| JP | 2011-143358 | 7/2011 |
| JP | 2011-163651 A | 8/2011 |
| JP | 2012-16645 A | 1/2012 |

* cited by examiner

VAPOR SEPARATOR AND DEHUMIDIFIER USING THE SAME

CROSS REFERENCE TO RELATED APPLICATION

This application is based upon and claims the benefit of priority from Japanese Patent Application No. 2016-047767, filed on Mar. 11, 2016; the entire contents of which are incorporated herein by reference.

FIELD

Embodiments described herein relate generally to a vapor separator and a dehumidifier using the same.

BACKGROUND ART

Air-conditioning technology for a domestic air conditioner progresses in both coolant and energy efficiency, and more comfortable life environment is required with the progress. Therefore, the air conditioner is made to have more functions not only for temperature but also for humidity control, ventilation, air flow control, and air cleaning. An improvement in energy efficiency is the most important issue also because of recent energy shortage. Also in hot and humid Asian countries, humidity control, in particular, dehumidification is considered to be important with improvement in standard of living. Performance of the dehumidification in an energy-saving manner can realize air conditioning with less environmental load. In dehumidification by cooling with coolant using a compressor that is a mainstream at present, a large quantity of energy is required to cool air so as to condensate vapor and to reheat the cooled air so as to regulate temperature. This increases power consumption, leading to an issue in magnitude of the environmental load.

In contrast, in a dehumidifier such as a desiccant air conditioner, a moisture absorber using an absorbent material absorbing vapor absorbs moisture in a room, and the dehumidifier heats the moisture and discharges the moisture to the outdoors. This dehumidification is therefore superior in energy saving performance to the coolant-type dehumidification. There are known absorbent materials made by impregnating a porous body such as porous ceramic or zeolite with a deliquescent substance made of bromide or chloride that contain sodium, lithium, calcium, or magnesium. The absorbent material (humidity controlling material), however, continues to absorb water and is finally saturated, and therefore needs to be subjected to regeneration treatment. The regeneration treatment for the absorbent material is performed by heating the absorbent material in order to discharge the absorbed water. Combination of the regeneration treatment (heat treatment) for the absorbent material and air cooling is inefficient.

As a method with less energy and at low cost alternative to the current air-conditioning method, a continuous dehumidification method using a vapor separator requiring no regeneration treatment is under discussion. An example of the structure of a humidity controller using the vapor separator is a structure in which a vapor separator made by filling a gap between two vapor permeable membranes using polyethylene or fluorine resin with a liquid absorbent such as a lithium chloride solution, is arranged between a space such as the interior of a room to be dehumidified and a space such as the exterior of the room. The vapor is sent and received between the air in the room and the liquid absorbent through the vapor permeable membranes. The vapor permeable membranes are, however, apt to break, and this method has difficulty in efficiently performing dehumidification because of low moving speed of vapor.

DETAILED DESCRIPTION

Figure 1:
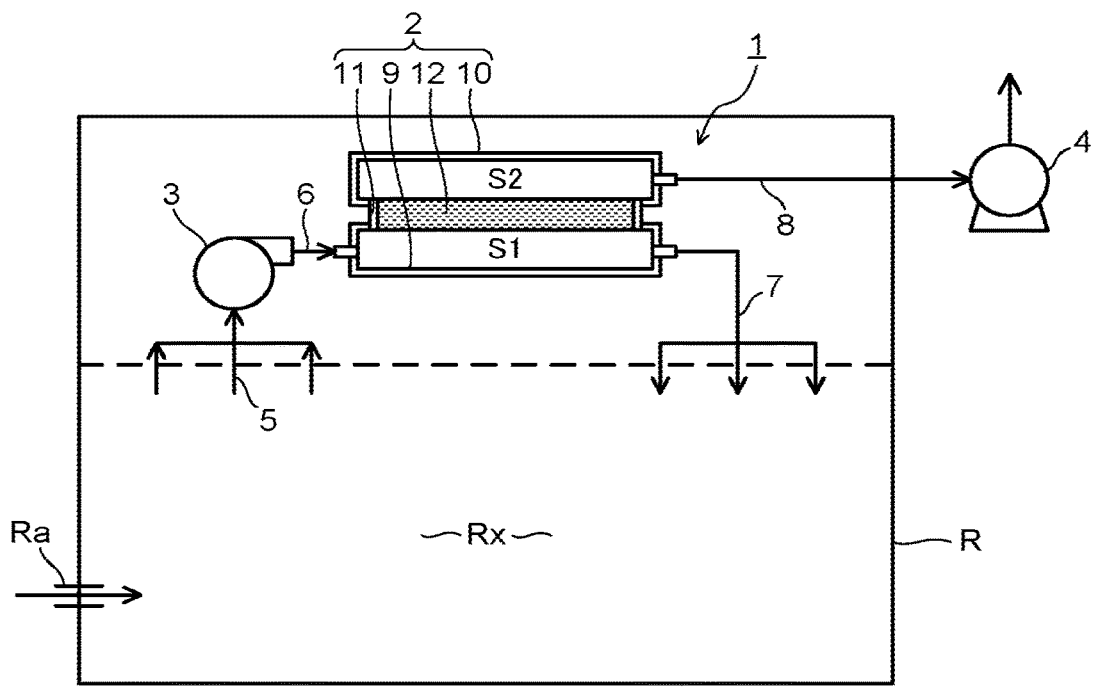
FIG. 1 shows a configuration of a dehumidifier according to an embodiment.

One embodiment provides a vapor separator (water vapor separator) arranged between a first space and a second space and configured to be permeated vapor existing in the first space in the second space by making a vapor pressure in the second space lower than a vapor pressure in the first space, the vapor separator including: a porous body having fine pores, and water present in the fine pores of the porous body. The porous body has a first face in contact with the first space, and the first face has a convexo-concave structure (relief structure). The porous body also has a second face in contact with the second space. The fine pores of the porous body pass to the second face from the first face, and at least part of the fine pores opens on walls which constitute the convexo-concave structure.

Another embodiment provides a dehumidifier including: a first space; a second space communicating with the first space; the vapor separator in the embodiment provided to separate the first space and the second space from each other while exposing the first face in the first space and exposing the second face in the second space; and a vapor pressure adjusting unit that adjusts a vapor pressure in the second space such that the vapor pressure in the second space becomes lower than a vapor pressure in the first space. The dehumidifier is an apparatus which is permeated the vapor existing in the first space in the second space through the vapor separator.

Hereinafter, the vapor separator and the dehumidifier using the same according to the embodiments will be described referring to the drawings. In the embodiments, substantially the same constituent portions are denoted by the same numerals and symbols and their description may be partially omitted. The drawings are schematic and relations between thicknesses and planar dimensions and ratios between thicknesses of portions may be different from actual ones.

FIG. 1 illustrates a configuration of the dehumidifier of the embodiment. In FIG. 1, R denotes a room constituting a dehumidification target space Rx, and the room R has an intake port Ra. A dehumidifier 1 is provided in the room R to remove vapor (moisture) from air in the dehumidification target space Rx. The air in the space Rx is basically composed of vapor (moisture) and dry air. The dehumidifier 1 includes a dehumidifying module 2, a blower 3 that sends the air from the space Rx to the dehumidifying module 2, and a pressure-reducing pump 4 that reduces the pressure in a part of the dehumidifying module 2. The space Rx and the blower 3 are connected to each other via a pipe 5, the blower 3 and the dehumidifying module 2 are connected to each other via a pipe 6, and the dehumidifying module 2 and the space Rx are connected to each other via a pipe 7. The dehumidifying module 2 and the pressure-reducing pump 4 are connected to each other via a pipe 8.

The dehumidifying module 2 has a dehumidified chamber (a first ventilation passage) 9 constituting a first space S1, a pressure-reduced chamber (a second ventilation passage) 10 constituting a second space S2, a connecting channel 11 connecting the dehumidified chamber 9 to the pressure-reduced chamber 10, and a vapor separator 12 arranged in the connecting channel 11 to separate the dehumidified chamber 9 from the pressure-reduced chamber 10. The blower 3 is operated to send the air from the space Rx into the dehumidified chamber 9 of the dehumidifying module 2 via the pipes 5 and 6. The air dehumidified in the dehumidified chamber 9 is caused to return to the space Rx via the pipe 7. The pressure-reducing pump 4 evacuates the pressure-reduced chamber 10 to generate a difference between the pressure in the dehumidified chamber 9 (pressure in the first space S1) and the pressure in the pressure-reduced chamber 10 (pressure in the second space S2).

Figure 2:
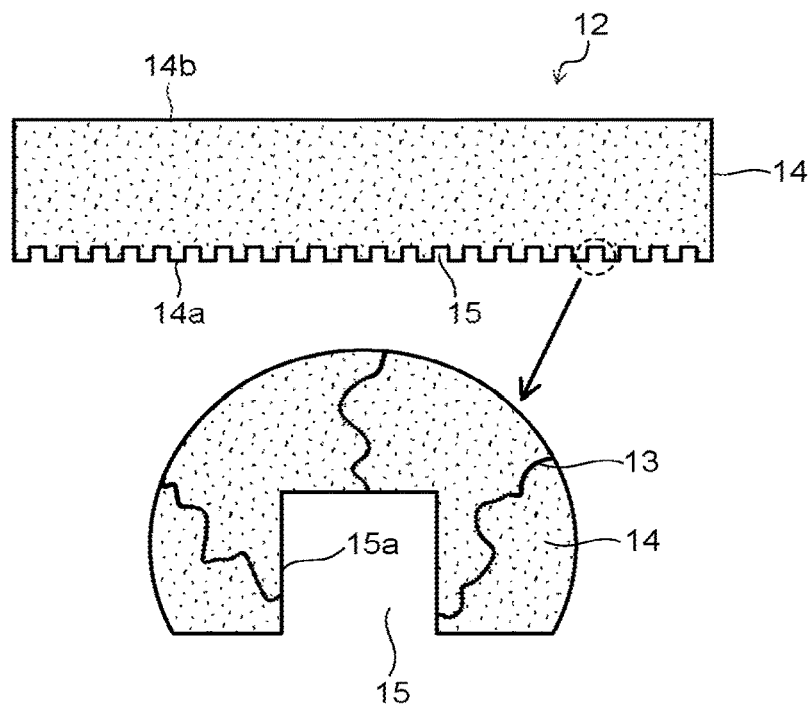
FIG. 2 is a cross-sectional of a vapor separator used in the dehumidifier illustrated in FIG. 1.

As illustrated in FIG. 2, the vapor separator 12 includes a porous body 14 having fine pores (open bores) 13, and water (not shown) existing in the fine pores 13 of the porous body 14. The water in the fine pores 13 forms a wet seal in the vapor separator 12.

As will be described later, an amount of moisture contained in the air that is introduced into the dehumidified chamber 9 from the space Rx is reduced for dehumidification as the water is moved to the pressure-reduced chamber 10 from the dehumidified chamber 9 via the vapor separator 12 that has the wet seal formed therein. Alternatively, non-aqueous liquid that can absorb water may be contained to make a seal. The space Rx may be dehumidified as the water is moved to the pressure-reduced chamber 10 from the dehumidified chamber 9 via the vapor separator 12 having such seal therein. Although a specific example of the non-aqueous liquid is ionic liquid (imidazolium type, ammonium type, or pyridinium type), the present invention is not limited in this regard. The water in the fine pores 13 is a substance that is expressed by a chemical symbol "$H_2O$," or any hydrate, accretion or inclusion that contains such substance. For example, the water that exists in the fine pores 13 includes ionic liquid that contains water, and triethylene glycol that contains water.

The porous body 14 possesses, for example, a rectangular parallelepiped shape, and has a first face 14a exposed inside the dehumidified chamber 9 (the first space S1) and a second face 14b exposed inside the pressure-reduced chamber 10 (the second space S2). The first face 14a has a convexo-concave structure. It should be noted that the convexo-concave structure of the first face 14a shown in FIG. 2 has a plurality of square recesses 15, but the present invention is not limited in this regard. The fine pores 13 formed in the porous body 14 pass from the first face 14a to the second face 14b. At least part of the fine pores 13 passes from the wall 15a of the recess 15 (i.e., wall that constitutes the convexo-concave structure) to the second face 14b. That is, at least part of the fine pores 13 opens on the wall 15a of the recess 15.

Figure 3:
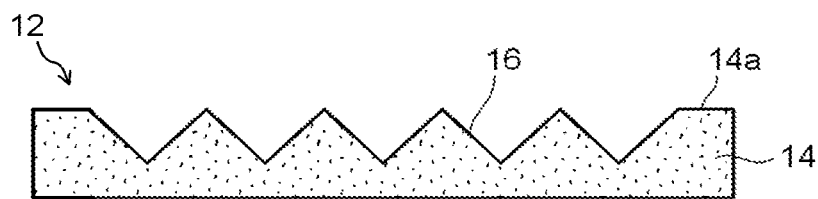
FIG. 3 is an enlarged and partial cross-sectional view of a first modification example of the vapor separator illustrated in FIG. 2.
Figure 4:
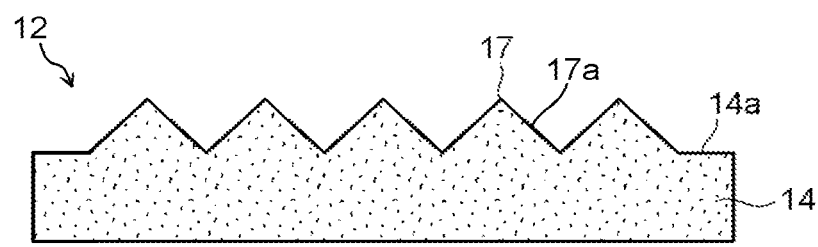
FIG. 4 is an enlarged and partial cross-sectional view of a second modification example of the vapor separator illustrated in FIG. 2.
Figure 5:
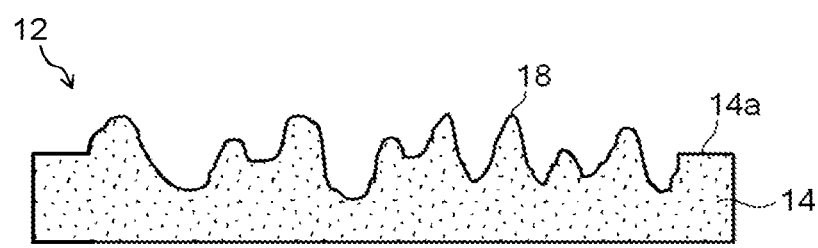
FIG. 5 is an enlarged and partial cross-sectional view of a third modification example of the vapor separator illustrated in FIG. 2.

The convexo-concave structure formed on the first face 14a is not limited to the structure shown in FIG. 2, i.e., the structure that has a plurality of square recesses 15. For example, the convexo-concave structure may have a plurality of projections on the first face 14a, i.e., the reverse structure of the structure shown in FIG. 2. FIG. 3 illustrates the porous body 14 that has the first face 14a with another convexo-concave structure. This convexo-concave structure includes a plurality of V grooves or V-shaped recesses 16. FIG. 4 illustrates the porous body 14 that has the first face 14a with still another convexo-concave structure. This convexo-concave structure includes a plurality of inverted V projections 17. When the convexo-concave structure has the projections 17, at least some of the fine pores 13 communicate from the wall surface 17a of the projections 17 to the second surface 14b. It should be noted that the recesses 15, 16 and the projections 17 may be formed at regular intervals or at irregular intervals. Alternatively, as shown in FIG. 5, an irregular convexo-concave structure 18 may be formed on the first face 14a. As understood from the foregoing, the convexo-concave structure formed on the first face 14a of the porous body 14 is not limited to a particular structure, i.e., the convexo-concave structure may include various shapes of recesses, projections (protrusions), and a combination of recesses and projections. It should also be noted that the convexo-concave structure may be formed on the second face 14b of the porous body 14.

When the first face 14a of the porous body 14 has the convexo-concave structure, a contact area between the convexo-concave structure (first face) and the air introduced to the dehumidification chamber 9 from the space Rx increases. The recesses 15, 16, the projections 17, and a combination of recesses and projections 18 have the fine pores 13 passing to the second face 14b from their walls, they can easily capture vapor/moisture. This facilitates the movement of the water to the pressure-reduced chamber 10 from the dehumidification chamber 9. If the first face 14a is flat, that moisture contained in the air which does not have a velocity component in a direction perpendicular to the flat face is difficult to capture. In contrast, if the first face 14a has the convexo-concave structure, the first face 14a is able to capture such moisture (water molecules). When easiness of the water molecule capturing is taken into account, then it is preferred that the convexo-concave structure has the recesses 16, the projections 17, or a combination of recesses and projections 18, as shown in FIG. 3, 4 or 5, because the convexo-concave structure includes inclined surfaces relative to the first face 14a. When the air is caused to flow along the first face 14a, the convexo-concave structure forces the air to flow in a complicated manner, which is different from when the first face 14a is flat. As a result, the fine pores 13 of the porous body 14 can easily catch the moisture. A combination of the above-described functions can increase (improve) the dehumidification speed and the dehumidification performance in the space Rx by the dehumidifier 1.

When the capability of capturing the vapor by the convexo-concave structure of the first face 14a should be ensured or enhanced, it is preferred that at least one of the surface roughness Ra, Ry and Rz of the first face 14a that has the convexo-concave structure is between 1 μm or more and 1 mm or less. Ra represents an arithmetic mean estimation, Ry represents a maximum height, and Rz represents a ten point height of irregularities. Ra, Ry and Rz are defined by JIS B0601 (1994). JIS stands for Japanese Industrial Standards. This ensures or improves the capability of capturing the vapor by the convexo-concave structure. If balance between the dehumidification speed and the strength (rigidity) of the porous body 14 is considered, it is preferred that at least one of the surface roughness Ra, Ry and Rz is between 10 μm or more and 100 μm or less. In addition, it is preferred that the surface roughness of the first face 14a that has the convexo-concave structure meets a condition that at least one of an average interval of the convexo-concave, Sm, and an average interval between local tops, S, is 1 μm or more and 10 mm or less. Sm and S are defined by JIS B0601 (1994). This also ensures or improves the capability of capturing the vapor by the convexo-concave structure. When the dehumidification speed and easiness of forming the convexo-concave structure are taken into account, it is preferred that at least one of the surface roughness Sm and S is 10 μm or more and 1 mm or less.

The porous body 14 is preferably made of an inorganic material such as a ceramic material, a metal material, a carbon material or a composite material of them. Examples of the ceramic material include oxide, nitride, carbide, silicate, and composite compounds of them of elements such as aluminum (Al), silicon (Si), zinc (Zn), magnesium (Mg), calcium (Ca), barium (Ba), nickel (Ni), cobalt (Co), iron (Fe), chromium (Cr), titanium (Ti), zirconium (Zr), and copper (Cu) (hereinafter, occasionally referred to as an element A). The porous body 14 may be made from a material such as zeolite. Examples of the metal material include metal elements such as aluminum, zinc, magnesium, nickel, cobalt, iron, titanium, zirconium, and copper (hereinafter, occasionally referred to as an element B), and alloys containing them. It should be noted that the porous body 14 may be made from an organic material in certain applications.

The volume porosity of the porous body 14 (the volume fraction of the fine pores 13 in the porous body 14) is preferably in a range of 10% to 80%. When the volume porosity of the porous body 14 is less than 10%, the vapor capable of passing through the fine pores 13 decreases and may result in an insufficient absorption amount of moisture from the inside of the dehumidified chamber 9 and an insufficient release amount of moisture to the pressure-reduced chamber 10. When the volume porosity of the porous body 14 is more than 80%, the strength (rigidity) of the porous body 14 decreases and may hinder continuous operation of the dehumidifier 1. From the viewpoint of the dehumidification speed, the volume porosity of the porous body 14 is more preferably in a range of 10% to 50%, and furthermore preferably in a range of 20% to 50%. It should be noted that it is preferable to set the volume porosity of the porous body 14 according to the property required of the vapor separator 12. For example, if a dehumidification speed should be raised, then it is preferable to set the volume porosity relatively high. On the other hand, if the mechanical strength (intensity) of the vapor separator 12 should be enhanced or the cost of the vapor separator 12 should be reduced, it is preferable to set the enhanced or the cost of the vapor separator 12 should be reduced, it is preferable to set the volume porosity relatively low.

The fine pores 13 of the porous body 14 preferably contain 50 mass % or more of fine pores having a pore size in a range of 10 nm to 1 μm. The maximum pore size of the fine pores 13 is preferably 3 μm or less. An amount of the fine pores having the above-mentioned pore size of less than 50 mass % (for example, a large volume fraction of fine pores having a pore size of more than 1 μm) or a maximum pore size of more than 3μm causes a decrease in wet sealing property or a decrease balance between absorption of moisture from the inside of the dehumidified chamber 9 and the release of moisture to the pressure-reduced chamber 10, and thus may decrease the dehumidification performance. The amount of the fine pores having the above-mentioned pore size is more preferably 70 mass % or more, and furthermore preferably 100 mass %. The maximum pore size of the fine pores 13 is more preferably 2 μm or less, and furthermore preferably 1 μm or less. It should be noted that the volume porosity of the porous body 14 and the shape of the fine pores 13 (the volume porosity and the maximum pore size of the fine pores) indicate values measured by the mercury intrusion method.

The pore size of the fine pores 13 is preferably set according to the characteristics required of the vapor separator 12. For example, if the vapor separation ratio of the vapor separator 12 should be increased, the fine pores 13 preferably contain 50 mass % or more of fine pores having a pore size in a range of 10 nm to 100 nm. In this case, the maximum pore size of the fine pores 13 is preferably 300 nm or less. On the other hand, if the vapor permeation rate of the vapor separator 12 should be increased, the fine pores 13 preferably contain 50 mass % or more of fine pores having a pore size in a range of 100 nm to 1 μm. In this case, the maximum pore size of the fine pores 13 is preferably 3 μm or less, and more preferably 2 μm or less. The characteristics of the vapor separator 12 is influenced also by the volume porosity of the porous body 14, and therefore it is preferable to set the pore size of the fine pores 13 in consideration of the volume porosity.

The method of manufacturing the porous body 14 is not limited to a particular method, and the porous body 14 may be manufactured in a following manner. For example, in the case of using the ceramic material such as alumina or zinc oxide, raw material powder is molded and then sintered to form into the porous body 14. The porous body 14 may contain inorganic fiber such as rock wool, ceramic wool, or glass wool. When zeolite is used as a constituent material of the porous body 14, raw material powder is pressure-molded to a porous green compact or compressed body (14). Alternatively, a zeolite film may be formed on a porous supporting medium to provide the porous body 14. If a metal material is used, raw material powder may be molded and sintered to provide the porous body 14, or a mixture of raw material powder and spacer material powder may be molded and sintered and then the spacer material may be removed to provide the porous body 14. A porosity metal may be used as the porous body 14.

A method of forming the above-described convexo-concave structure on the first face 14a of the porous body 14 is not limited to a particular method. For example, a following method may be employed. If a machining equipment or a cutting machine such as a dicing machine is used, a plurality of grooves that have predetermined width and depth are formed in (on) the surface of the sintered porous body or the porous green compact by, for example, the dicing machine. As a result, the convexo-concave structure is provided on the surface 14a of the porous body 14. Alternatively, the surface of the sintered porous body or the porous green compact is roughened by blasting or the like such that the surface of the sintered porous body or the porous green compact has a predetermined (desired) surface roughness, thereby providing the convexo-concave structure on the surface 14a of the porous body 14. Alternatively, a mold (die) that has a convexo-concave surface may be prepared, and such mold is used to mold a blank of the sintered porous body or to prepare a porous green compact. The convexo-concave surface of the mold is transferred to the surface of the molded body or the porous green compact, thereby providing the convexo-concave structure on the surface 14a of the porous body 14. If the porous body 14 is a thin film, a convexo-concave may be formed in the surface of the porous supporting medium.

Figure 6:
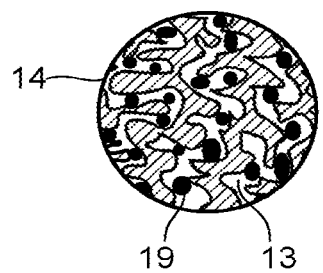
FIG. 6 is an enlarged cross-sectional view of an exemplary inner structure of the vapor separator illustrated in FIG. 2.

When a wet seal is formed in the vapor separator 12, it is preferred that, as shown in FIG. 6, the vapor separator 12 has a soluble absorbent 19 in the fine pores 13 of the porous body 14. The soluble absorbent 19 absorbs moisture and holds it, and therefore it is easy to form the wet seal in the vapor separator 12. The soluble absorbent 19 may be citrate, carbonate, phosphate, halide salt, oxysalt, hydroxide salt, or sulfate of a group 1 element or a group 2 element (hereinafter, occasionally referred to as element C). One of these compounds may be used alone, or some of these compounds may be used together. In FIG. 6, the soluble absorbent 19 is illustrated to be segregated in the fine pore 13. It should be noted, however, that the existence form of the soluble absorbent 19 is not limited to the illustrated form. For example, the soluble absorbent 19 may adhere thin and uniformly to the whole or part of an inner wall of the fine pore 13.

Specific examples of the soluble absorbent 19 include calcium chloride ($CaCl_2$), lithium chloride (LiCl), sodium chloride (NaCl), potassium chloride (KCl), lithium bromide (LiBr), sodium bromide (NaBr), potassium bromide (KBr), lithium iodide (LiI), sodium iodide (NaI), potassium iodide (KI), calcium oxide (CaO), sodium oxide ($Na_2O$), potassium oxide ($K_2O$), calcium hydroxide ($Ca(OH)_2$), sodium hydroxide (NaOH), potassium hydroxide (KOH), lithium hydroxide (LiOH), calcium carbonate ($CaCO_3$), magnesium carbonate ($MgCO_3$), lithium carbonate ($Li_2CO_3$), sodium carbonate ($Na_2CO_3$), potassium carbonate ($K_2CO_3$), sodium phosphate ($Na_3PO_4$), potassium phosphate ($K_3PO_4$), sodium citrate ($Na_3(C_3H_5O(COO)_3$ and so on), potassium citrate ($K_3(C_3H_5O(COO)_3$ and so on), sodium sulfate ($Na_2SO_4$), potassium sulfate ($K_2SO_4$), lithium sulfate ($Li_2SO_4$), and their hydrates.

An amount of the soluble absorbent 19 allowed to exist in the fine pores 13 of the porous body 14 is preferably adjusted to make the ratio of the element C constituting the soluble absorbent 19 to the element A constituting the ceramic material or the element B constituting the metal material (C/A or C/B: atom ratio) fall within a range of 0.004 to 0.4 when the porous body 14 is composed of the ceramic material or the metal material. The C/A ratio or C/B ratio of less than 0.004 leads to an insufficient amount of the soluble absorbent 19. The C/A ratio or C/B ratio of more than 0.4 makes it more difficult to allow the soluble absorbent 19 to exist in the fine pores 13 of the porous body 14. The C/A ratio or the C/B ratio is more preferably in a range of 0.008 to 0.25.

A method of manufacturing the vapor separator 12 is not limited to a particular method. For example, the vapor separator 12 may be manufactured in the following manner. When the vapor separator 12 does not have the soluble absorbent 19, the porous body 14, which is prepared by the above-mentioned method, is used as the vapor separator 12. When the vapor separator 12 has the soluble absorbent 19, the porous body 14, which is prepared by the above-mentioned method, is impregnated with a water solution (prepared by dissolving the soluble absorbent 19 in the water) and dried to provide the vapor separator 12. The drying process is used because the dried body is easy to handle. The drying process may not be applied to the porous body. The vapor separator 12 may contain moisture from the beginning. The raw material powder for the porous body 14 may be mixed with the soluble absorbent 19 and then molded and sintered.

Figure 7:
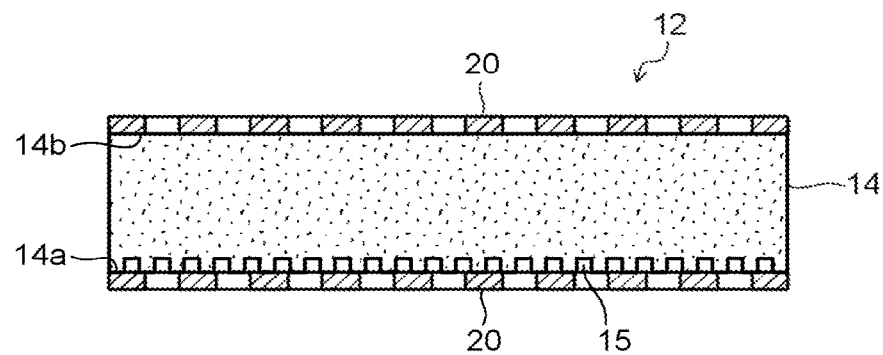
FIG. 7 is a cross-sectional view illustrating a use example of the vapor separator illustrated in FIG. 2.

The vapor separator 12 used for the dehumidifier 1 may be supported as illustrated in FIG. 7 by substrates (supports) 20 that allow gas to permeate. FIG. 7 illustrates a state in which a pair of substrates 20 are arranged along both faces of the vapor separator 12. It should be noted that the substrate 20 may be arranged along only one of the faces of the vapor separator 12. For the substrate 20, a porous body, a punching material, or a mesh material having open pores made of a ceramic material, a metal material, a carbon material, an organic material or a composite material of them is used. Specific examples of the substrate 20 include paper, polyimide porous body, and punching metal. The substrate 20 preferably has through holes having a diameter of, but not limited to, several micrometers or more.

The vapor separator 12 may be formed directly on the substrate 20. The vapor separator 12 may be fabricated, for example, by forming the porous body 14 on the substrate 20 by the cold spraying method or the aerosol deposition method. Alternatively, the vapor separator 12 may be formed by impregnating the porous body 14 with the soluble absorbent 19. A multilayer porous body may be made by forming a plurality of raw ceramic material layers, which will become the porous body 14 of the vapor separator 12 having a smaller pore size, on a raw ceramic base material having a larger pore size, and then sintering them. The multilayer porous material is ceramics in this embodiment, but not limited to this. For example, the multilayer porous material may be metal. Its shape is not limited to a sheet shape but may be a honeycomb shape or a tube shape.

The vapor separator 12 used for the dehumidifier 1 preferably contains moisture at least during the operation of the dehumidifier 1. The amount of moisture contained in the vapor separator 12 is preferably set to make the ratio of a volume V2 of water to a volume of the porous body 14 (a solid volume of the porous body 14 excluding the volume of the fine pores 13) V1, i.e., the ratio V2/V1, fall within a range of 0.01 to 4. The volume ratio V2/V1 of less than 0.01 may decrease the wet sealing property of the vapor separator 12. A volume ratio (V2/V1) of more than 4 makes it more difficult to allow moisture to exist in the porous body 14. The volume ratio (V2/V1) of the moisture contained in the porous body 14 to the porous body 14 itself is more preferably in a range of 0.5 to 4, and furthermore preferably in a range of 0.5 to 1. It should be noted that when the soluble absorbent 19 is present in the fine bores 13 of the vapor separator 12, the volume V2 of water means the volume containing the soluble absorbent 19.

In the dehumidifier 1 of this embodiment, the air in the dehumidification target space Rx is sent into the dehumidified chamber 9 of the dehumidifying module 2 by the blower 3. The pressure-reducing pump 4 is operated simultaneously with the blower 3 to reduce the pressure in the pressure-reduced chamber 10. This generates a difference between the pressure in the dehumidified chamber 9 and the pressure in the pressure-reduced chamber 10. The pressure difference makes the vapor pressure in the pressure-reduced chamber 10 (a vapor pressure in the second space S2) lower than the vapor pressure in the dehumidified chamber 9 (a vapor pressure in the first space Si). The vapor pressure difference and the moisture held in the vapor separator 12 cause the vapor (moisture) to move between the dehumidified chamber 9 and the pressure-reduced chamber 10 via the vapor separator 12.

When the vapor (moisture) should move through the vapor separator 12, the pressure-reducing pump 4 preferably reduces the pressure in the pressure-reduced chamber 10 so that the pressure in the pressure-reduced chamber 10 becomes −50 kPa or less relative to the pressure in the dehumidified chamber 9. In other words, the pressure-reducing pump 4 preferably reduces the pressure in the pressure-reduced chamber 10 so that the difference between the pressure in the dehumidified chamber 9 and the pressure in the pressure-reduced chamber 10 becomes 50 kPa or more. A pressure difference of less than 50 kPa may fail to sufficiently promote the movement of the vapor (moisture) from the inside of the dehumidified chamber 9 to the inside of the pressure-reduced chamber 10. The pressure difference between the dehumidified chamber 9 and the pressure-reduced chamber 10 is further preferably less than 100 kPa. A too-large pressure difference may damage the porous body 14 of the vapor separator 12. The pressure difference between the dehumidified chamber 9 and the pressure-reduced chamber 10 is more preferably in a range of 80 to 90 kPa.

In the dehumidifier 1 illustrated in FIG. 1, the pressure-reducing pump 4 reducing the pressure in the pressure-reduced chamber 10 generates the vapor pressure difference between the dehumidified chamber 9 and the pressure-reduced chamber 10. It should be noted that an adjusting unit for the vapor pressure is not limited to this. The adjusting unit may be configured, for example, to introduce dry air or heated air into the pressure-reduced chamber 10 (the second space S2). This configuration can also generate the vapor pressure difference between the dehumidified chamber 9 and the pressure-reduced chamber 10. In the dehumidifier 1 illustrated in FIG. 1, a vapor pressure adjusting unit for generating the vapor pressure difference between the dehumidified chamber 9 and the pressure-reduced chamber 10 is not limited to a particular configuration, and various mechanisms capable of generating the vapor pressure difference are applicable.

The vapor (moisture) contained in the air in the dehumidified chamber 9 relatively high in vapor pressure is absorbed into the wet seal in the vapor separator 12. When the vapor separator 12 has the soluble absorbent 19, the vapor (moisture) is absorbed by the soluble absorbent 19. The moisture in the vapor separator 12 permeates the pressure-reduced chamber 10 having a relatively low vapor pressure. Depending on the balance among the vapor pressure in the dehumidified chamber 9, the vapor pressure in the pressure-reduced chamber 10, and the amount of moisture in the vapor separator 12, absorption of the vapor (moisture) contained in the air in the dehumidified chamber 9 by the vapor separator 12 and release of the moisture from the vapor separator 12 into the pressure-reduced chamber 10 occur in succession. This can reduce the amount of moisture in the air, which is sent from the space Rx into the dehumidified chamber 9, and achieve dehumidification. The dehumidified air is caused to return to the space Rx. The moisture that has permeated the pressure-reduced chamber 10 is discharged to the outside via the pipe 8 and the pressure-reducing pump 4. Alternatively, the moisture that has permeated the pressure-reduced chamber 10 may be sent to a third space such as a room that needs humidification.

The vapor separator 12 in the embodiment can also be used as an apparatus for both dehumidification and humidification.

In the dehumidifier 1 of the embodiment, the vapor separator 12 forms the wet seal to cause only the moisture contained in the air in the dehumidified chamber 9 to move into the pressure-reduced chamber 10. Between the dehumidified chamber 9 and the pressure-reduced chamber 10, basically, only the moisture in the air moves and the dry air in the air hardly moves. This rarely fluctuates the temperature in the dehumidification target space Rx. Dehumidification in the space Rx without rarely fluctuating the temperature in the space Rx eliminates the possibility of declining the thermal efficiency, for example, even in combination with air cooling in the space Rx. This can result in improved thermal efficiency when using the dehumidifier 1 in combination with air cooling.

Figure 8:
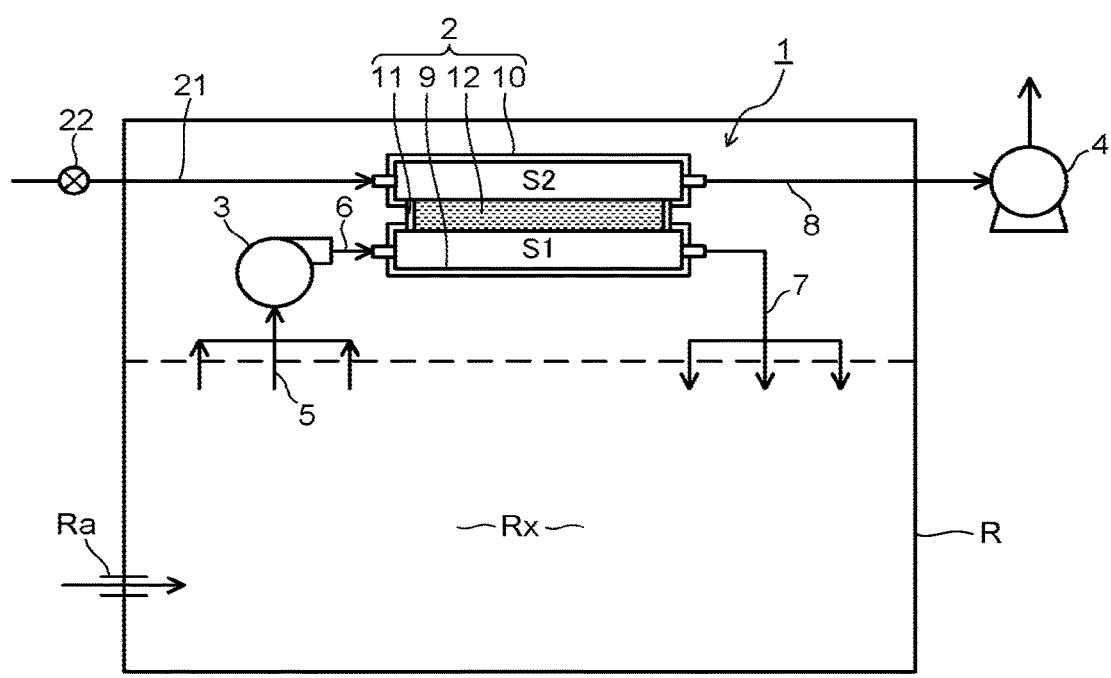
FIG. 8 shows a first modification example of the dehumidifier illustrated in FIG. 1.
Figure 9:
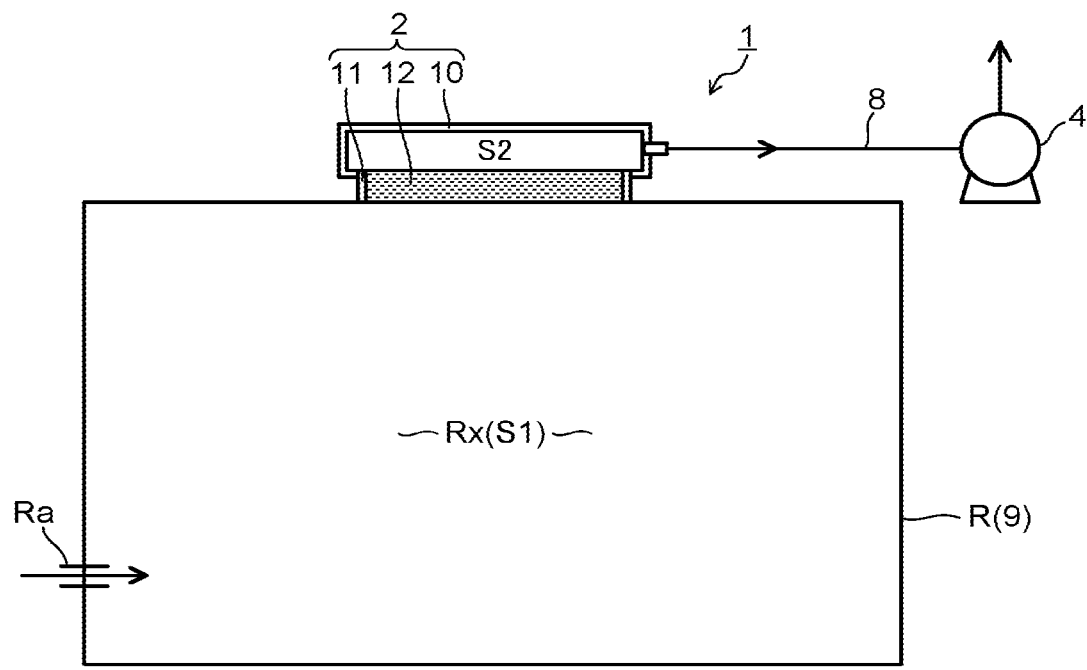
FIG. 9 shows a second modification example of the dehumidifier illustrated in FIG. 1.
Figure 10:
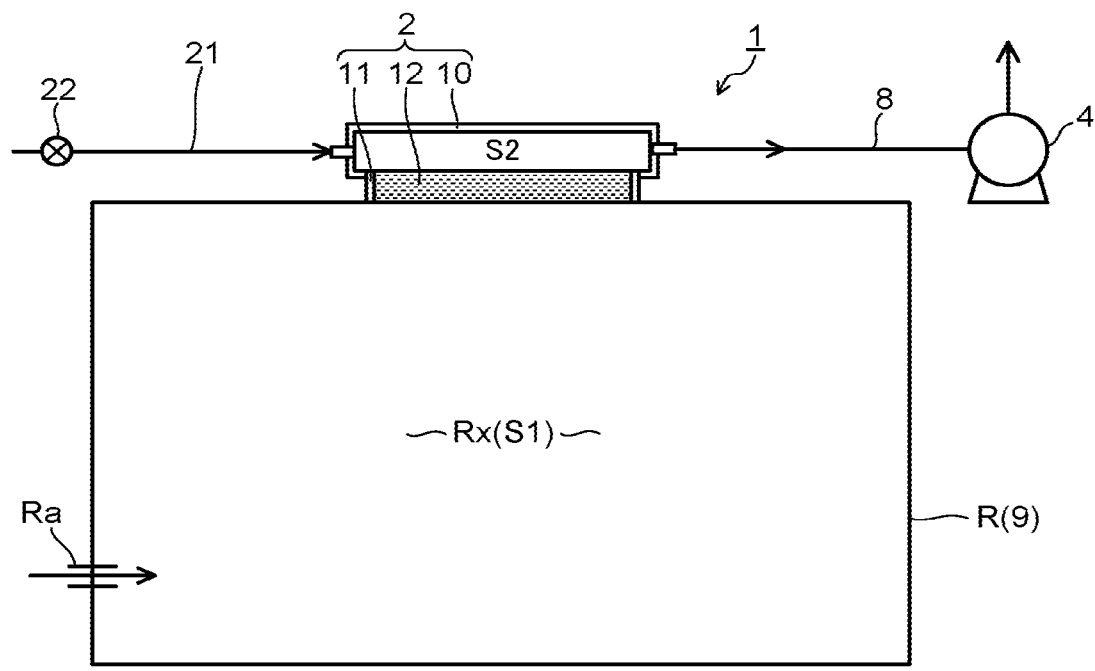
FIG. 10 shows a third modification example of the dehumidifier illustrated in FIG. 1.

The structure of the dehumidifier 1 in this embodiment is not limited to the structure illustrated in FIG. 1. FIG. 8 illustrates a structure that includes a pipe 21 to take the outside air into the pressure-reduced chamber 10 (the second space S2) is connected to the pressure-reduced chamber 10. In the dehumidifier 1 illustrated in FIG. 8, the pressure in the pressure-reduced chamber 10 is reduced while the outside air is being taken into the pressure-reduced chamber 10. The pipe 21 has a valve 22. The dehumidifier 1 in the embodiment may be modified in various ways. The first space S1 is defined in the dehumidified chamber 9 of the dehumidifying module 2 in FIG. 1 and FIG. 8, but the first space S1 is not limited to this. As illustrated in FIG. 9, the first space S1 may be the dehumidification target space Rx itself. Specifically, the pressure-reduced chamber 10 that serves as the second space S2 and the space Rx that serves as the first space S1 may be arranged with the vapor separator 12 intervening between them. In this arrangement, the reduction of the pressure in the pressure-reduced chamber 10 directly removes the vapor (moisture) from the air in the dehumidification target space Rx (the first space S1). The setting of the first space S1 and the second space S2 may be modified in various ways. Alternatively, a pipe 21 may be connected to the pressure-reduced chamber 10 (the second space S2) such that the outside air is taken into the pressure-reduced chamber 10, as shown in FIG. 10.

In the dehumidifier 1 that uses the vapor separator 12 of the embodiment, the wet seal is formed in the vapor separator 12. Thus, it is possible to facilitate the continuous dehumidification without a regeneration treatment, and enhance (increase) the dehumidification capability during the continuous dehumidification. Furthermore, it is possible to enhance the capability of capturing the water molecules and increase the dehumidification speed because the convexo-concave structure is formed on the first face (the face exposed in the first space S1) 14a of the porous body 14 of the vapor separator 12. Thus, a practical and efficient dehumidifier 1 is provided. The characteristics of the vapor separator 12 may be decided in accordance with the required dehumidification capability as well as other factors such as the environment where the vapor separator 12 is used. For example, even if the dehumidification capability is sacrificed to a certain extent, it is preferred that the mechanical strength (intensity, rigidity) or the like of the vapor separator 12 is enhanced, if the vapor separator 12 is used in a harsh environment. With regard to the dehumidification capability, the configuration and/or the characteristics of the vapor separator 12 may be adjusted or modified, depending upon whether or not the target humidity is more important than the dehumidification speed.

The dehumidification speed V is a value that is measured in the follow manner. Firstly, a 1 L (one liter) container is placed in a high-humidity vessel. The temperature of the vessel is constant, and the high humidity of the vessel is maintained. The 1 L container has a hole having a 10 mm diameter. The 1 L container defines the space Rx therein. Then, the dehumidifier shown in FIG. 10 is used to perform the dehumidification, with the pressure of the second space being −80 kPa relative to the first space. Time spent until the relative humidity drops to 60% from 70% is converted to an area of the vapor separator. The measured temperature is 40° C., and an effective area of the vapor separator is a diameter 10 mm. For example, if one hour is spent until the relative humidity drops to 60% from 70%, then the dehumidification speed V is 10%/h.

Next, examples and their evaluation results will be described.

EXAMPLE 1

An acetone solution of polyvinyl butyral (PVB) with a concentration of 5% was added to high-purity $Al_2O_3$ particles (purity of 99.99% or more) with an average particle diameter of 0.18 μm, and they were mixed together in a mortar. The mixture was filled in a metal mold and molded under a pressure of 1 t/cm², further sintered at 1000° C., and thereby formed into a sintered porous body with a thickness of 1 mm. Measurement of the fine pore shape of the sintered porous body by the mercury intrusion method showed that the fine pore size was 10 to 200 nm, the percentage of fine pores with a pore size of 10 to 100 nm was 90 mass %, and the percentage of fine pores with a pore size of 10 nm to 1 μm was 100 mass %. The volume porosity of the sintered porous body was 42%.

Subsequently, a group of grooves, each having a 100 μm depth and a 100 μm width, were formed on the surface of the sintered porous body at 100 μm intervals by a dicing machine. Further, another group of grooves having the same shape as these grooves were formed such that the two groups of grooves crossed each other perpendicularly. As a result, the convexo-concave structure was formed on the surface of the sintered porous body. The resulting convexo-concave structure included a plurality of 100 μm cubes that projected from the surface of the sintered porous body. The surface roughness Ra of the surface that has this convexo-concave structure is equivalent to 50 μm, and the average interval of the convexo-concave, Sm, is equivalent to 200 μm. It can be said that the surface area of the surface having the convexo-concave structure has increased 1% from the surface area of "before the grooves are made by the dicing machine."

By impregnating the above-described sintered porous body with a saturated solution of $CaCl_2$ and drying the resulting sintered porous body, an intended vapor separator was obtained. The Ca/Al ratio of the vapor separator was 0.11. Measurement of the dehumidification speed V of the vapor separator under the above-mentioned conditions showed that the dehumidification speed V was 17%/h. The temperature in the dehumidification target space during the dehumidification test was stable in a range of 40° C.±1° C. Similar measurement after one month showed no changes. The ratio of the volume of water to the volume of the porous body after the measurement was 0.72.

EXAMPLE 2

An acetone solution of PVB with a concentration of 5% was added to high-purity ZnO particles (purity of 99.99% or more) with an average particle diameter of 0.15 μm, and they were mixed together in a mortar. The mixture was filled in a metal mold and molded under a pressure of 1 t/cm², further sintered at 1000° C., and thereby formed into a sintered porous body with a thickness of 1 mm. Measurement of the fine pore shape of the sintered porous body by the mercury intrusion method showed that the fine pore size was 10 to 150 nm, the percentage of fine pores with a pore size of 10 to 100 nm was 70 mass %, and the percentage of fine pores with a pore size of 10 nm to 1 μm was 100 mass %. The volume porosity of the sintered porous body was 35%.

Subsequently, a group of grooves, each having a 100 μm depth and a 100 μm width, were formed on the surface of the sintered porous body at 100 μm intervals by a dicing machine. Further, another group of grooves having the same shape as these grooves were formed such that the two groups of grooves crossed each other perpendicularly. As a result, the convexo-concave structure was formed on the surface of the sintered porous body. The resulting convexo-concave structure included a plurality of 100 μm cubes that projected from the surface of the sintered porous body. The surface roughness Ra of the surface that has this convexo-concave structure is equivalent to 50 μm, and the average interval of the convexo-concave, Sm, is equivalent to 200 μm. It can be said that the surface area of the surface having the convexo-concave structure has increased 1% from the surface area of "before the grooves are made by the dicing machine."

By impregnating the above-described sintered porous body with a saturated solution of $CaCl_2$ and drying the resulting sintered porous body, an intended vapor separator was obtained. The Ca/Zn ratio of the vapor separator was 0.12. Measurement of the dehumidification speed of the vapor separator under the above-mentioned conditions showed that the dehumidification speed was 13%/h. The temperature in the dehumidification target space during the dehumidification test was stable in a range of 40° C.±1° C. Similar measurement after one month showed no changes. The ratio of the volume of water to the volume of the porous body after the measurement was 0.54.

EXAMPLE 3

A dehumidification test similar to Example 1 was carried out, with the vapor separator prepared in Example 1 being supported by a punching metal. The pressure difference was set to −90 kPa at the time of the dehumidification test. The humidification test showed that the dehumidification speed V was 19%/h. Similar measurement after one month showed no changes. Thus, when the vapor separator is supported by the punching metal, it is possible to raise the pressure difference at the dehumidification process, and improve the dehumidification speed V.

Comparative Example 1

A sintered porous body was prepared under the same conditions as Example 1. The pore size and the volume porosity of the sintered porous body were generally similar to those of Example 1. The vapor separator was obtained by impregnating the sintered porous body with a saturated solution of $CaCl_2$ without forming the convexo-concave structure on the surface of the sintered porous body and drying the same. Measurement of the dehumidification speed V of the vapor separator under the above-mentioned conditions showed that the dehumidification speed V was 15%/h.

Comparative Example 2

A sintered porous body was prepared under the same conditions as Example 2. The pore size and the volume porosity of the sintered porous body were generally similar to those of Example 2. The vapor separator was obtained by impregnating the sintered porous body with a saturated solution of $CaCl_2$ without forming the convexo-concave structure on the surface of the sintered porous body and drying the same. Measurement of the dehumidification speed V of the vapor separator under the above-mentioned conditions showed that the dehumidification speed V was 12%/h.

EXAMPLE 4

Zeolite DDZ-70 (product name, manufactured by Union Showa Co., Ltd.) with an average particle diameter being 0.7 µm was filled in a metal mold and molded under a pressure of 1 t/cm², and thereby formed into a porous green compact with a thickness of 1 mm. Measurement of the fine pore shape of the porous green compact and other dimensions of the same by the mercury intrusion method showed that the fine pore size was 10 to 500 nm, the percentage of fine pores with a pore size of 10 to 100 nm was 20 mass %, and the percentage of fine pores with a pore size of 10 nm to 1 µm was 100 mass %. The volume porosity of the porous green compact was 36%.

Subsequently, a group of grooves, each having a 100 µm depth and a 100 µm width, were formed on the surface of the porous green compact at 100 µm intervals by a dicing machine. Further, another group of grooves having the same shape as these grooves were formed such that the two groups of grooves crossed each other perpendicularly. As a result, the convexo-concave structure was formed on the surface of the porous green compact. The resulting convexo-concave structure included a plurality of 100 µm cubes that projected from the surface of the porous green compact. The surface roughness Ra of the surface that has this convexo-concave structure is equivalent to 50 µm, and the average interval of the convexo-concave, Sm, is equivalent to 200 µm. It can be said that the surface area of the surface having the convexo-concave structure has increased 1% from the surface area of "before the grooves are made by the dicing machine." Measurement of the dehumidification speed V of the vapor separator, which included the porous green compact, under the above-mentioned conditions showed that the dehumidification speed V was 4%/h. Similar measurement after one month showed no changes.

Comparative Example 3

A porous green compact was prepared under the same conditions as Example 4. The pore size and the volume porosity of the porous green compact were generally similar to those of Example 4. The porous green compact was used as a vapor separator, without forming the convexo-concave structure on the surface of the porous green compact. Measurement of the dehumidification speed V of the vapor separator showed that the dehumidification speed V was 3%/h.

While certain embodiments of the present invention have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A vapor separator arranged between a first space and a second space, the vapor separator comprising: a porous body including a first face in contact with the first space, a second face in contact with the second space, and fine pores passing to the second face from the first face, the first face having a convexo-concave structure, and at least part of the fine pores opening on walls which constitute the convexo-concave structure; and water existing in the fine pores of the porous body, wherein the vapor separator is configured to be permeated by vapor existing in the first space to the second space by making a vapor pressure in the second space lower than a vapor pressure in the first space.

2. The vapor separator of claim 1, further comprising:
   a soluble absorbent existing in the fine pores of the porous body,
   wherein the water is held in the soluble absorbent.

3. The vapor separator of claim 2, wherein the soluble absorbent contains at least one selected from the group consisting of citrate, carbonate, phosphate, halide salt, oxysalt, hydroxide salt, and sulfate of a first element composed of a group 1 element or a group 2 element.

4. The vapor separator of claim 1, wherein at least one of Ra, Ry and Rz of a surface roughness of the first face having the convexo-concave structure falls in a range from 1 µm to 1 mm, where Ra represents an arithmetic mean estimation, Ry represents a maximum height, and Rz represents a ten point height of irregularities.

5. The vapor separator of claim 1, wherein at least one of Sm and S of a surface roughness of the first face having the convexo-concave structure falls in a range from 1 µm to 10 mm, where Sm represents an average interval of convexo-concave and S represents an average interval of local tops.

6. The vapor separator of claim 1, wherein a volume porosity of the porous body is from 10% to 80%.

7. The vapor separator of claim 1, wherein the fine pores of the porous body contain 50 mass % or more of pores having a pore size of 10 nm to 1 µm.

8. The vapor separator of claim 1, wherein a maximum pore size of the fine pores of the porous body is 3 µm or less.

9. The vapor separator of claim 1, wherein the porous body comprises at least one selected from the group consisting of a ceramic material, a metal material, and a carbon material.

10. The vapor separator of claim 1, wherein a ratio of a volume of the water to a volume of the porous body is from 0.01 to 4.

11. A dehumidifier comprising:
    a first space;
    a second space communicating with the first space;
    the vapor separator according to claim 1, the vapor separator being provided to separate the first space and the second space from each other while exposing the first face in the first space and exposing the second face in the second space; and
    a vapor pressure adjusting unit which adjusts a vapor pressure in the second space such that the vapor pressure in the second space be lower than a vapor pressure in the first space,
    wherein the vapor existing in the first space is permeated in the second space through the vapor separator.

12. The dehumidifier of claim 11, wherein the vapor pressure adjusting unit comprises a pressure adjusting unit that reduces a pressure in the second space to be lower than a pressure in the first space.

13. The dehumidifier of claim 12, wherein the pressure adjusting unit is controlled to make the pressure in the second space −50 kPa or less relative to the pressure in the first space.

14. The dehumidifier of claim 11, wherein the vapor separator is supported by a substrate that allows gas to permeate.

* * * * *